June 12, 1956  C. E. FORKEL  2,750,158
PEBBLE HEAT EXCHANGE CHAMBER
Filed July 28, 1952  2 Sheets-Sheet 1

INVENTOR.
C. E. FORKEL
BY Hudson and Young
ATTORNEYS

June 12, 1956  C. E. FORKEL  2,750,158
PEBBLE HEAT EXCHANGE CHAMBER
Filed July 28, 1952  2 Sheets-Sheet 2

INVENTOR.
C. E. FORKEL
BY *Hudson and Young*
ATTORNEYS

United States Patent Office 2,750,158
Patented June 12, 1956

2,750,158

PEBBLE HEAT EXCHANGE CHAMBER

Curt E. Forkel, Bartlesville, Okla., assignor to Phillips Petroleum Company, a corporation of Delaware Application July 28, 1952, Serial No. 301,409

7 Claims. (Cl. 257—55)

This invention relates to pebble heater apparatus. In one of its more specific aspects, it relates to improved pebble heat exchange chambers of pebble heater apparatus. In another of its more specific aspects, it relates to improved means for removing gaseous effluent from a pebble chamber. In another of its more specific aspects, it relates to means for controlling the flow of gaseous materials through a gravitating pebble mass in a pebble chamber. In another of its more specific aspects, it relates to a method of obtaining more nearly equal pebble-gas contact time through pebble heater and reaction chambers.

Apparatus of the so-called "pebble heater" type has been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about one inch in diameter. In a high temperature process, pebbles having a diameter of between ¼ inch to ⅜ inch are preferred. The pebbles must be formed of refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebble formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1600° F. to 3000° F. are desirable.

One disadvantage of conventional pebble chambers in which a contiguous gravitating pebble mass is maintained in direct heat exchange with gaseous material, is that it is most difficult to establish uniform contacting of gas and pebbles. In a chamber in which the withdrawal of pebbles is made from a substantially central point in its bottom section, the center of the pebble bed tends to drop out at all levels in the pebble bed below a level or height in the neighborhood of less than 1½ times the diameter of a cylinder serviced by the single pebble outlet. It has also been established, that when the gases are introduced into the lower portion of the gravitating pebble mass, those gases tend to take the path of least resistance and channel through the shallowest portion of the pebble bed. Because of this type of pebble-gas contact, there is non-uniform heat exchange between the pebbles and the gaseous material. Pebbles gravitated from the pebble heater chamber tend to be non-uniformly heated and gases which are removed from the reactor chamber are non-uniformly converted.

Each feed to a reactor chamber of a pebble heater apparatus has different characteristics. In particular, these characteristics cause different temperature gradients across the surface of the pebble bed within the reactor. This is the case regardless of whether multiple inlets or a single pebble inlet are provided in the reactor. Thus, a reactor which is designed to crack normal butane (with a heat of reaction of about 850 B. t. u./pound) will have a smaller temperature gradient across the top of the bed than the same reactor will have when it is converted to crack ethane (with a heat of reaction of about 2100 B. t. u./pound).

The same reactor will thus necessarily have to be modified somewhat in order to obtain the most efficient contact between the contiguous gravitating pebble mass and the gaseous feed. It should also be noted that any reactor which is designed and placed in operation for the first time will also require some adjustment to bring about the most efficient operation thereof. My invention makes possible the modification of such pebble heat exchange chambers in a rapid and feasible manner.

Each of the following objects of the invention is attained by at least one aspect of the invention.

An object of this invention is to provide improved means for controlling the removal of gaseous effluent from pebble chambers. Another object of the invention is to provide means for controlling the flow of gaseous material through selected portions of a gravitating pebble mass within a pebble chamber. Another object of the invention is to provide means for obtaining more uniform heat exchange between a gaseous feed and a gravitating contiguous pebble mass into which that gaseous feed is introduced. Other and further objects of the invention will be apparent upon study of the accompanying disclosure.

Broadly speaking, this invention comprises an improvement in pebble heat exchange chambers by providing a central gaseous effluent conduit extending downwardly into the pebble mass within the pebble chamber and a second gaseous effluent conduit extending upwardly from the upper end of the pebble chamber. Each of these gaseous effluent conduits is provided with a flow control valve so as to permit the control of removal of gaseous effluent material from selected portions of the pebble mass.

Better understanding of this invention will be apparent to those skilled in the art upon study of the diagrammatic drawings in which Figure 1 is a vertical section of a pebble chamber embodying this invention.

Figures 1, 2:
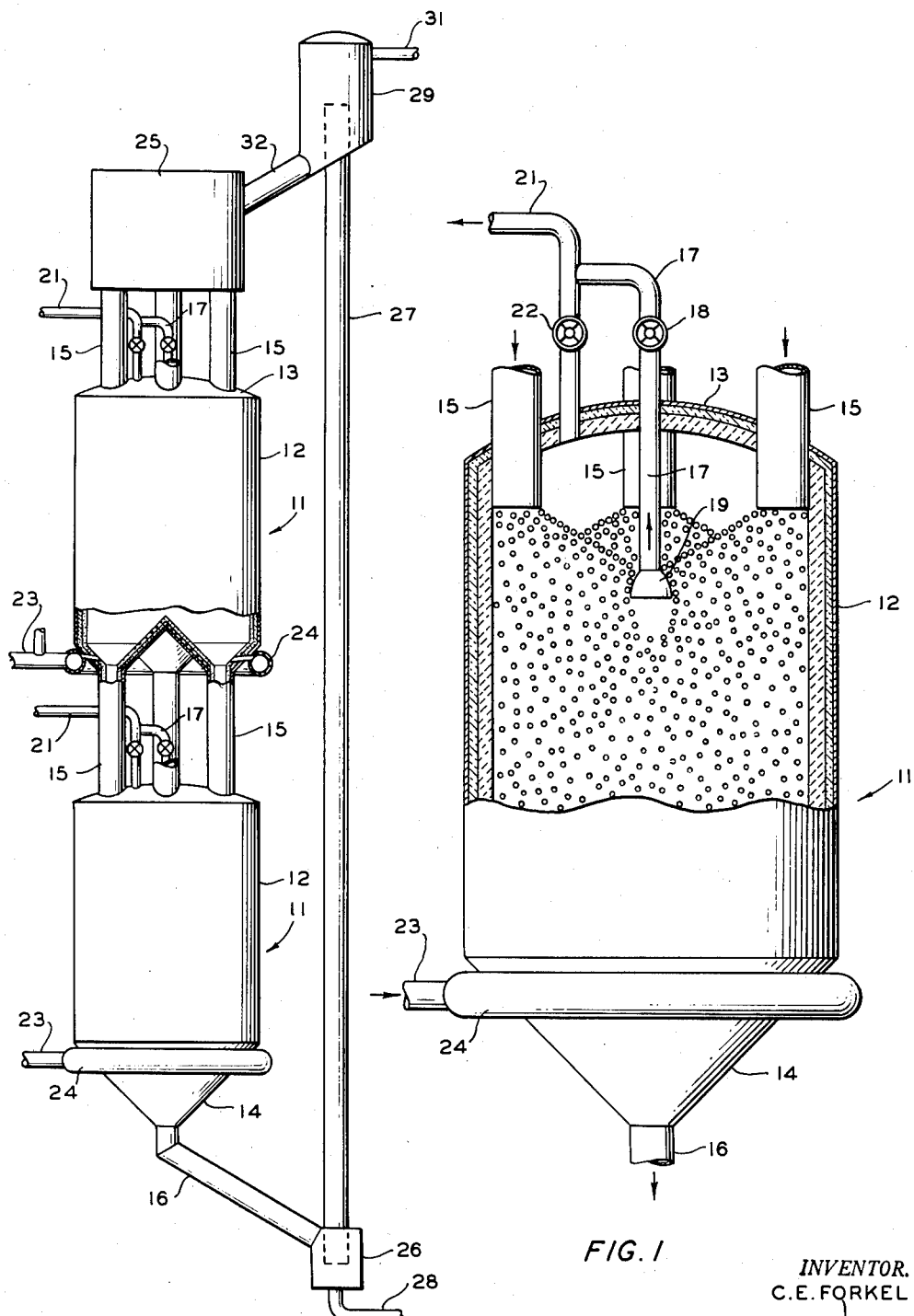
Figure 2 is a diagrammatic sectional representation of pebble heater apparatus of this invention.

Referring particularly to the device shown in Figure 1 of the drawings, pebble heat exchange chamber 11 comprises upright elongated shell 12 closed at its upper and lower ends by closure members 13 and 14, respectively. Pebble inlet conduits 15 are provided in the upper end portion of shell 12, preferably in closure member 13 and adjacent the side wall of that shell. Pebble outlet conduit 16 is provided in the lower end portion of shell 12. The pebble outlet means from chamber 11 may be a single pebble conduit, as shown in Figure 1, or may be a plurality of pebble conduits shown between the upper and lower chambers in Figure 2 which will be described hereafter. Gaseous effluent outlet conduit 17 is centrally positioned within the upper end portion of the chamber formed within shell 12 and extends downwardly into the chamber formed within shell 12 to a level below the lower ends of pebble conduits 15 and to a level below the normal level of the pebble mass in that central portion of the pebble chamber. Flow control valve 18 is provided in conduit 17 so as to provide means for controlling the flow of gaseous effluent through that conduit. The lower end portion of conduit 17 is preferably enlarged as shown by section 19 so as to facilitate the convenient collection of gaseous effluent within the pebble mass. The lower end of section 19 may be open or may be provided with a perforate member which permits the flow of gaseous material therethrough but which prevents the flow of pebbles therethrough. Gaseous effluent conduit 21 extends from the upper end of shell 12, preferably from a point intermediate the axis and periphery of that shell. One or more such gaseous effluent conduits may be utilized, as desired. Flow control valve 22 is provided in conduit 21 so as to control the flow of gaseous effluent therethrough. The downstream end of conduit 17 is preferably connected to conduit 21 downstream of valve 22 so as to permit the convenient removal of gaseous effluent as a single product stream. Gaseous material inlet conduit 23 is connected to the lower end portion of chamber 11 and communicates with the chamber formed within shell 12, preferably through closure member 14 by means of header member 24.

Figure 3:
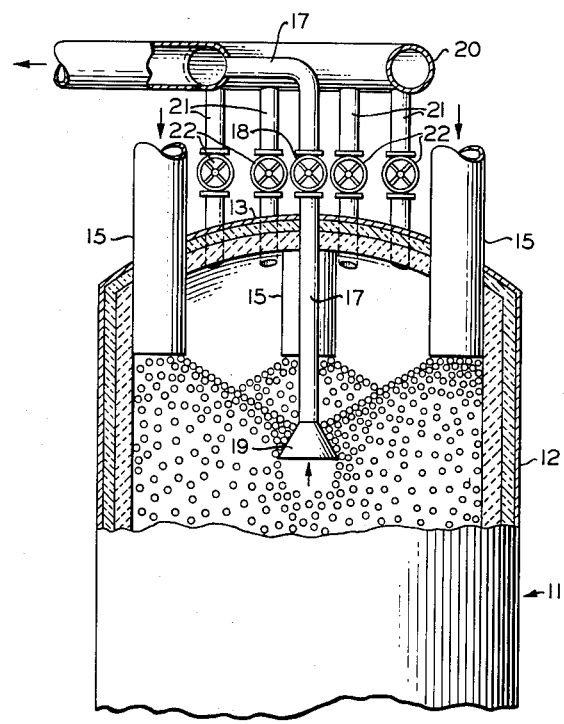
Figure 3 is a partial sectional view of a pebble chamber illustrating a modification of the invention.

Figure 3 of the drawing illustrates a modification of the invention in which a plurality of gaseous effluent conduits 21 extend from the upper end of shell 12 from a point intermediate the axis and periphery of that shell. Elements corresponding to those described in relation to Figure 1 are designated by identical reference numerals. Gaseous effluent conduits 17 and 21 are connected to header member 20 in order to provide for the removal of gaseous effluent as a single product stream.

Referring particularly to the device shown as Figure 2 of the drawings, parts like those described in connection with the chamber of Figure 1 are numbered as disclosed in connection with the parts of the chamber of Figure 1. When a plurality of pebble inlets to the upper chamber 11 is utilized, surge chamber 25 is preferably connected to the upper ends of conduits 15. A single pebble inlet conduit may be utilized in the upper end portion of the upper chamber if it is desired only to control the gas-pebble contact in the reactor chamber. As shown in Figure 2, the gaseous effluent conduits are preferably those described in connection with Figure 1 of the drawings. In the modification shown in Figure 2 of the drawings, a plurality of pebble outlet conduits 15 extend downwardly from the lower end of the upper chamber to the peripheral portion of the upper end of lower chamber 11. Gaseous material inlet conduit 23 and header member 24 are connected to the lower end portion of the upper chamber 11 as described in connection with Figure 1 of the drawings. Gaseous effluent conduits 17 and 21 are those described in connection with Figure 1 of the drawings together with their flow control valves 18 and 22, respectively. Gaseous material inlet conduit 23 and header member 24 are connected to the lower end of the lower chamber 11 as described in connection with Figure 1 of the drawings. Pebble outlet conduit 16 extends downwardly from the lower end of the lower chamber to a pebble entraining chamber 26. Pebble entraining chamber 26 surrounds the lower end of gas lift conduit 27. Lift gas inlet conduit 28 extends into the lower end portion of pebble entraining chamber 26 and is coaxially positioned with respect to gas lift conduit 27 so as to entrain pebbles from chamber 26 and to carry them upwardly through gas lift conduit 27. Gas-pebble separator chamber 29 surrounds the upper end portion of gas lift conduit 27 and is provided in its upper end portion with gaseous effluent conduit 31. Pebble conduit 32 extends from the lower end portion of gas-pebble separator chamber 29 and, if a single pebble inlet conduit is utilized, this conduit may form that inlet to the upper chamber 11. In the modification shown in Figure 2 of the drawings, pebble conduit 32 extends into the upper end portion of surge chamber 25.

In the operation of the device shown in Figures 1 and 2, pebbles are introduced into the upper end portion of the upper chamber 11, preferably through a plurality of pebble conduits 15 disposed about and adjacent to the periphery of the upper chamber. The pebbles gravitate downwardly through this chamber as a contiguous gravitating pebble mass. The pebbles flow downwardly and inwardly from the pebble conduits, thus forming a pebble mass, the upper surface of which is in the shape of an inverted cone. Gaseous heating material is introduced into the lower portion of the gravitating pebble mass through inlet conduit 23 and header member 24. This gaseous heating material may be in the form of preheated gases, such as combustion gases, or may be in the form of fuel and air which materials are burned within the lower portion of the upper pebble chamber 11, one method being that of burning the materials on the surface of the pebbles. The hot gaseous heat exchange materials pass upwardly through the contiguous gravitating pebble mass within the upper chamber and are removed from the upper portion of the chamber formed within the upper shell 12 by means of gaseous effluent conduits 17 and 21 in controlled amounts. The flow of gaseous material through valves 18 and 22 is balanced so as to cause a desired portion of the gaseous material to flow through the pebble mass outside of the axial portion thereof. In this manner, the flow of gaseous materials is so controlled as to obtain more uniform contact between gas and pebbles in all portions of the pebble chamber. The pebbles are thus heated to a more uniform temperature.

Pebbles which are uniformly heated in the upper chamber 11 gravitate through a plurality of conduits, such as conduits 15, into the lower chamber 11 and form a contiguous gravitating mass therein. Gaseous material to be heated within the lower chamber (e. g., propane or butane) is introduced into the lower portion of the lower pebble chamber 11 through inlet conduit 23 and header member 24. The gaseous feed passes upwardly through the gravitating mass of heated pebbles and is raised to the desired temperature in direct heat exchange with the uniformly heated pebbles. Gaseous effluent is removed from the upper end portion of the lower chamber 11 through gaseous effluent conduits 17 and 21, the flow through each of those conduits being controlled by valves 18 and 22, respectively. Valves 18 and 22 can be controlled in accordance with a measurement of the properties of the gaseous effluent, such as specific gravity, infra-red analysis, and the like so as to obtain the desired products in the greatest possible quantity. Pebbles are gravitated from the lower end portion of the lower chamber 11 into pebble entraining chamber 26 wherein they are entrained in a stream of lift gas and are carried through gas lift conduit 27 to gas-pebble separator chamber 29. The pebbles settle out of the gas stream within chamber 29 and flow through pebble conduit 32 into surge chamber 25. Lift gas is removed from the upper end portion of chamber 29 through gaseous effluent conduit 31. The pebbles are then returned to the upper end portion of the upper chamber 11 for reheating.

Other and further modifications of this invention will be apparent to those skilled in the art upon study of the accompanying disclosure. Such modifications are believed to be within the spirit and the scope of this application, the purpose of which is to teach a means for obtaining closer control of the flow of gaseous material through selected portions of a gravitating pebble mass and so as to control the contact time of gases and pebbles within specific portions of the gravitating pebble mass.

I claim:

1. An improved pebble heat exchange chamber comprising in combination a closed upright, elongated shell; pebble inlet conduit means extending into the upper end portion of said shell adjacent its periphery; pebble outlet means in the lower end of said shell; gaseous effluent outlet conduit means extending from the upper end of said shell intermediate the axis and periphery thereof; and a central gaseous effluent conduit extending from a level, in the chamber formed by said shell, below the normal level of the pebble mass in the central portion of said chamber upwardly through the upper end of said shell.

2. The pebble heat exchange chamber of claim 1 wherein a flow control is provided in each of said gaseous effluent outlet conduits.

3. The pebble heat exchanger of claim 2 wherein the lower end of said central gaseous effluent conduit is of larger cross-section than the upper portion thereof.

4. An improved pebble heat exchange chamber comprising, in combination, a closed upright, elongated shell; a plurality of pebble inlet conduits extending into the upper end portion of said shell adjacent its periphery; pebble outlet means in the lower end of said shell; a first gaseous effluent conduit extending from the upper end of said shell intermediate the axis and periphery thereof; and a second gaseous effluent conduit substantially centrally disposed in the upper end of said shell and extending downwardly into the chamber formed within said shell to a level below the normal level of the pebble mass in the central portion of said chamber.

5. The pebble heat exchange chamber of claim 4 wherein a flow control means is provided in each of said gaseous effluent outlet conduits.

6. An improved pebble heat exchange chamber comprising, in combination, a closed upright, elongated shell; a plurality of pebble inlet conduits extending into the upper end portion of said shell adjacent its periphery; pebble outlet means in the lower end of said shell; a first gaseous effluent conduit extending from the upper end of said shell intermediate the axis and periphery thereof; a first flow control means in said first gaseous effluent conduit; a second gaseous effluent conduit substantially centrally disposed in the upper end of said shell and extending downwardly into the chamber formed within said shell to a level below the normal level of the pebble mass in the central portion of said chamber, said second gaseous effluent conduit being connected to said first gaseous effluent conduit at a point downstream of said first flow control means; and second flow control means in said second gaseous effluent conduit.

7. An improved pebble heat exchange chamber comprising, in combination, a closed upright elongated shell; a plurality of pebble inlet conduits extending into the upper end portion of said shell adjacent its periphery; pebble outlet means in the lower end of said shell; a plurality of gaseous effluent outlet conduits extending from the upper end of said shell intermediate the axis and periphery thereof; and a single gaseous effluent conduit substantially centrally disposed in the upper end of said shell and extending downwardly into the chamber formed within said shell to a level below the lower ends of said pebble inlet conduits.

References Cited in the file of this patent

UNITED STATES PATENTS

| | | |
|---|---|---|
| 2,554,435 | Weber | May 22, 1951 |
| 2,576,058 | Weber | Nov. 20, 1951 |